US008307247B2

(12) United States Patent
Shillington et al.

(10) Patent No.: US 8,307,247 B2
(45) Date of Patent: *Nov. 6, 2012

(54) SYSTEM AND METHOD FOR REMOTELY DEBUGGING APPLICATION PROGRAMS

(75) Inventors: Ryan Shillington, Austin, TX (US); Will Scott, Austin, TX (US); Dan Burton, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,373

(22) Filed: Dec. 15, 2010

(65) Prior Publication Data

US 2011/0088015 A1 Apr. 14, 2011

Related U.S. Application Data

(63) Continuation of application No. 09/902,128, filed on Jul. 10, 2001, now Pat. No. 7,873,872.

(51) Int. Cl.
*G06F 11/00* (2006.01)
(52) U.S. Cl. ..................... 714/38.14; 717/124; 717/125
(58) Field of Classification Search .............. 714/38.14
See application file for complete search history.

(56) References Cited

U.S. PATENT DOCUMENTS

| | | | |
|---|---|---|---|
| 6,026,362 A | 2/2000 | Kim et al. | |
| 6,119,247 A | 9/2000 | House et al. | |
| 6,167,535 A | 12/2000 | Foote et al. | |
| 6,263,456 B1 | 7/2001 | Boxall et al. | |
| 6,526,524 B1 | 2/2003 | Kelley | |
| 6,618,854 B1 | 9/2003 | Mann | |
| 6,668,369 B1 * | 12/2003 | Krebs et al. ................. 717/125 |
| 6,697,964 B1 | 2/2004 | Dodrill et al. | |
| 6,782,386 B1 | 8/2004 | Gebauer | |

(Continued)

OTHER PUBLICATIONS

Non-Final Rejection mailed Mar. 25, 2004 in the U.S. Appl. No. 09/902,128.

(Continued)

*Primary Examiner* — Yolanda L Wilson
(74) *Attorney, Agent, or Firm* — Hamilton & Terrile, LLP; Kent B. Chambers (57) ABSTRACT

A method, system, and apparatus for debugging an application program from a workstation that is remote from a server on which the application program resides includes invoking the application program from the workstation via a network interface; displaying a user frame at the workstation that includes information generated by the application program; providing a debug view option at the workstation for generating a debug frame of the application program; and displaying the debug frame at the workstation when the debug view option is selected. A user can select options to switch between the user frame and the debug frame. The debug frame includes information about one or more components of the application program such as a list of the variables or objects, and the fields, methods, and/or the constructors associated with them. When the debug view option is selected, the information for the user frame is saved, and can be restored to regenerate the information on the user frame when the user view option is selected. The developer can view internal, public, and private code associated with the application program without compromising the security of other application programs on the server. This ability to remotely debug application programs in accordance with the present invention is thus more time and cost efficient than previous methods, and also alleviates concerns about security and unauthorized access to the server.

42 Claims, 8 Drawing Sheets

U.S. PATENT DOCUMENTS

| | | |
|---|---|---|
| 6,938,245 B1 | 8/2005 | Spertus et al. |
| 2001/0004766 A1 | 6/2001 | Koyama |
| 2002/0156799 A1 | 10/2002 | Markel et al. |

OTHER PUBLICATIONS

Applicant Response to Non-Final Rejection of Mar. 25, 2004, as filed in the U.S. Appl. No. 09/902,128 on Oct. 1, 2004.

Final Rejection mailed Jan. 19, 2005 in the U.S. Appl. No. 09/902,128.

Notice of Appeal and Pre-Brief Conference Request, as filed in the U.S. Appl. No. 09/902,128 on Jul. 21, 2005.

Amendment after Notice of Appeal, as filed in the U.S. Appl. No. 09/902,128 on Sep. 2, 2005.

Pre-Brief Appeal Conference Decision and Examiner Interview Summary Record mailed Oct. 11, 2005 in the U.S. Appl. No. 09/902,128.

Non-Final Rejection mailed Dec. 27, 2005 in the U.S. Appl. No. 09/902,128.

Applicant Response to Non-Final Rejection of Dec. 27, 2005, as filed in the U.S. Appl. No. 09/902,128 on Jun. 27, 2006.

Final Rejection mailed Sep. 6, 2006 in the U.S. Appl. No. 09/902,128.

Applicant Response to Final Rejection of Sep. 6, 2006, as filed in the U.S. Appl. No. 09/902,128 on Feb. 6, 2007.

Advisory Action mailed Feb. 22, 2007 in the U.S. Appl. No. 09/902,128.

Notice of Appeal and Pre-Brief Conference Request, as filed in the U.S. Appl. No. 09/902,128 on Mar. 6, 2007.

Pre-Brief Appeal Conference Decision mailed Apr. 18, 2007 in the U.S. Appl. No. 09/902,128.

Appeal Brief, as filed in the U.S. Appl. No. 09/902,128 on Oct. 18, 2007.

Non-Final Rejection mailed Jul. 21, 2009 in the U.S. Appl. No. 09/902,128.

Response to Non-Final Rejection of Jul. 21, 2009, as filed in the U.S. Appl. No. 09/902,128 on Jan. 21, 2010.

Final Rejection mailed Apr. 27, 2010 in the U.S. Appl. No. 09/902,128.

Applicant Response to Final Rejection of Apr. 27, 2010, as filed in the U.S. Appl. No. 09/902,128 on Aug. 27, 2010.

Notice of Allowance mailed Sep. 13, 2010 in the U.S. Appl. No. 09/902,128.

\* cited by examiner

SYSTEM AND METHOD FOR REMOTELY DEBUGGING APPLICATION PROGRAMS

CROSS-REFERENCE TO RELATED APPLICATIONS

This application is a continuation of application Ser. No. 09/902,128, filed Jul. 10, 2001 now U.S. Pat. No. 7,873,872, which is incorporated herein by reference in its entirety.

BACKGROUND OF THE INVENTION

Application programs, such as web pages, are typically deployed on a server connected to an information network, such as the well-known World Wide Web. The applications are accessible by users at facilities that are remote from the site of the server that executes the application programs. This implementation has important benefits such as reducing computer memory and processing requirements at the remote client, and increasing the security of the application by retaining selected portions of the application in a secure location in the Web server.

One disadvantage of implementing the application remotely from the end user is that the person responsible for debugging problems with the application program(s) is also typically located at a site that is remote from the location of the server.

One approach that is currently available allows complete access to servers from remote locations. Many customers are uncomfortable with this approach due to the potential for unauthorized access to the information contained on the server. Complete access to the servers also poses a risk of disrupting operation of the server, whether malicious or unintentional. The alternative with this approach is for a consultant to travel to the site of the server to debug problems with the application programs, which is both more time consuming and costly than desired.

Therefore, there is a requirement for the capability to access and debug application programs from a location that is remote from the site of the server that executes the application program(s). The capability should not allow unauthorized access to other information stored on the server where the application program being debugged resides. The capability should also not allow disrupting the server's operation.

SUMMARY OF THE INVENTION

In one embodiment, a method of debugging an application program from a workstation that is remote from a server on which the application program resides is provided. The method includes:
  invoking the application program from the workstation via a network interface;
  displaying a user frame at the workstation that includes information generated by the application program;
  providing a debug view option at the workstation for generating a debug frame of the application program; and
  displaying the debug frame at the workstation when the debug view option is selected.

In one aspect of this embodiment, the debug frame includes information about one or more components of the application program.

In another aspect of this embodiment, the user is provided with a user view option at the workstation for generating the user frame. The user frame is displayed at the workstation when the user view option is selected.

In another aspect of this embodiment, the debug frame at the workstation displays a list of variable names in the application program. When used in a Java programming language environment, the debug frame can include a list of request information variable names and/or session information variable names in the application program.

In another aspect of this embodiment, one or more of the variable names represents a corresponding object. When the user selects one of the variable names, the debug frame displays information about the object corresponding to the variable name. The information about the object can include the fields of the object, the methods associated with the object, and/or the constructors associated with the object.

In another embodiment, a method of debugging an application program from a workstation that is remote from a server on which the application program resides is provided. The method includes:
  executing the application program on the server when the application program is invoked from the workstation;
  generating information for a user frame at the workstation that includes information generated by the application program; and
  generating information for a debug frame at the workstation when a debug view option is selected from the workstation, wherein the debug frame includes information about components of the application program.

In one aspect, this embodiment includes generating information for the debug frame includes saving the information for the user frame when the debug view option is selected. The saved information can be restored and displayed on the user frame when a user view option is selected at the workstation.

In another aspect, this embodiment includes generating a list of components of the application program which can include a list of variables in the application program, a list of methods associated with one or more of the variables in the application program, and/or a list of constructors associated with one or more of the variables in the application program. These lists of components can be generated using reflection technology conventionally available in known computer programming environments.

The methods in accordance with the present invention can be embodied in the form of computer-implemented processes and apparatuses for practicing those processes. The methods can also be embodied in the form of computer program code embodied in tangible media, such as floppy diskettes, CD-ROMS, hard drives, or any other computer-readable storage medium where, when the computer program code is loaded into and executed by a computer, the computer becomes an apparatus for practicing the invention. The method can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The various embodiments of the present invention for remotely debugging an application program can be implemented for use in a variety of programming language environments. For example, the remote workstation can include a web browser for viewing web pages that are generated by a Java application program on a remote server, and transmitted to the workstation via a network interface. If there is a problem with the application program, a developer can invoke the debug frame to investigate the status of various components in the application program, such as the value of one or more variables. The developer can also view information related to each of the variables, such as the fields, methods, and constructors associated with the variables. The developer can view internal, public, and private code associated with the program without compromising the security of other application programs on the server. This ability to remotely debug application programs in accordance with the present invention is thus more time and cost efficient than previous methods, and also alleviates concerns about security and unauthorized access to the server.

The above as well as additional objectives, features, and advantages of embodiments of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

In at least one embodiment, the present invention provides capability to debug an application program without allowing access to other information on a server, or disrupting the server's operation. A debugger program in accordance with the present invention allows access to information pertaining to the application program being debugged, but does not allow the information to be changed. Information regarding the environment in which the application program is running can be displayed, such as the computational resources required by the application program, and the vendor and version of compilers and other programs that are used in connection with the application program. The source of problems for an application program can also be investigated at a site that is remote from the server on which the application program is running.

An example of one type of problem that can be investigated with a debugger program in accordance with the present invention is the generic "null pointer" message that is commonly displayed for a malfunctioning web page.

Figure 1:
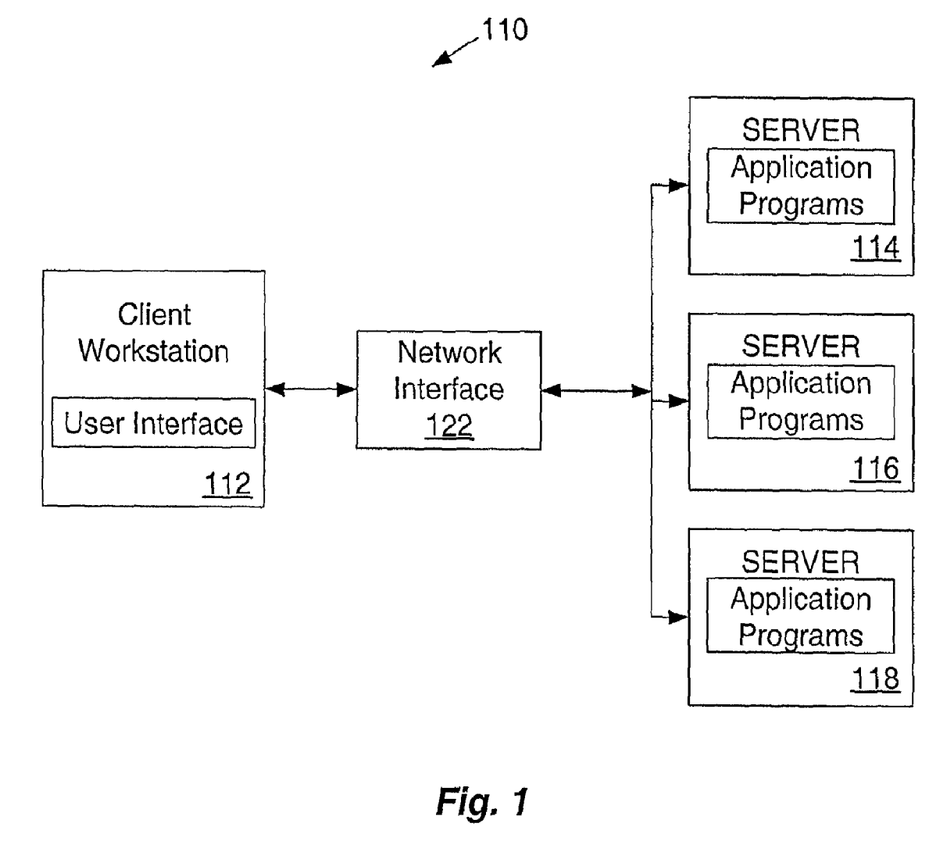
FIG. 1 is a diagram showing a network environment with a remote user.

Referring now to FIG. 1, an information network 110, such as the Internet, is shown in FIG. 1. A user that wishes to access information on the Internet typically has a client workstation 112 capable of establishing a communication link with servers 114, 116, 118 through network interface 122. Various communications links may be utilized, such as a dial-up wired connection with a modem, a direct link such as a T1, ISDN, or cable line, a wireless connection through a cellular or satellite network, or a local data transport system such as Ethernet or token ring over a local area network. Accordingly, network interface 122 includes networking equipment that is suitable to support the communication link being utilized. In addition, workstation 200 may be one of many workstations connected to other types of networks such as a local area network (LAN), a wide area network (WAN), or other information network through network interface 122.

Workstation 112 typically includes a user interface to allow the user to enter commands and/or information including requests to search for documents pertaining to a specified topic, to send or receive electronic mail, to interact with an electronic commerce site, and/or to provide data input. One such user interface is a web browser, such as Internet Explorer, which is commercially available from Microsoft Corporation in Redmond, Wash. The user interface uses various standardized interface protocols for accessing information from servers 114, 116, 118. For example, hypertext transfer protocol (HTTP) and HTTP secure (HTTPS) are used to access web pages, simple mail transfer protocol (SMTP), Internet message access protocol (IMAP), and post office protocol (POP) which are used to access electronic mail, and domain name system (DNS), dynamic host configuration protocol (DHCP), and lightweight directory access protocol (LDAP) which are used to access directories and other databases. Application programs are included in servers 114, 116, and 118 to perform tasks requested by the user.

Figure 2:
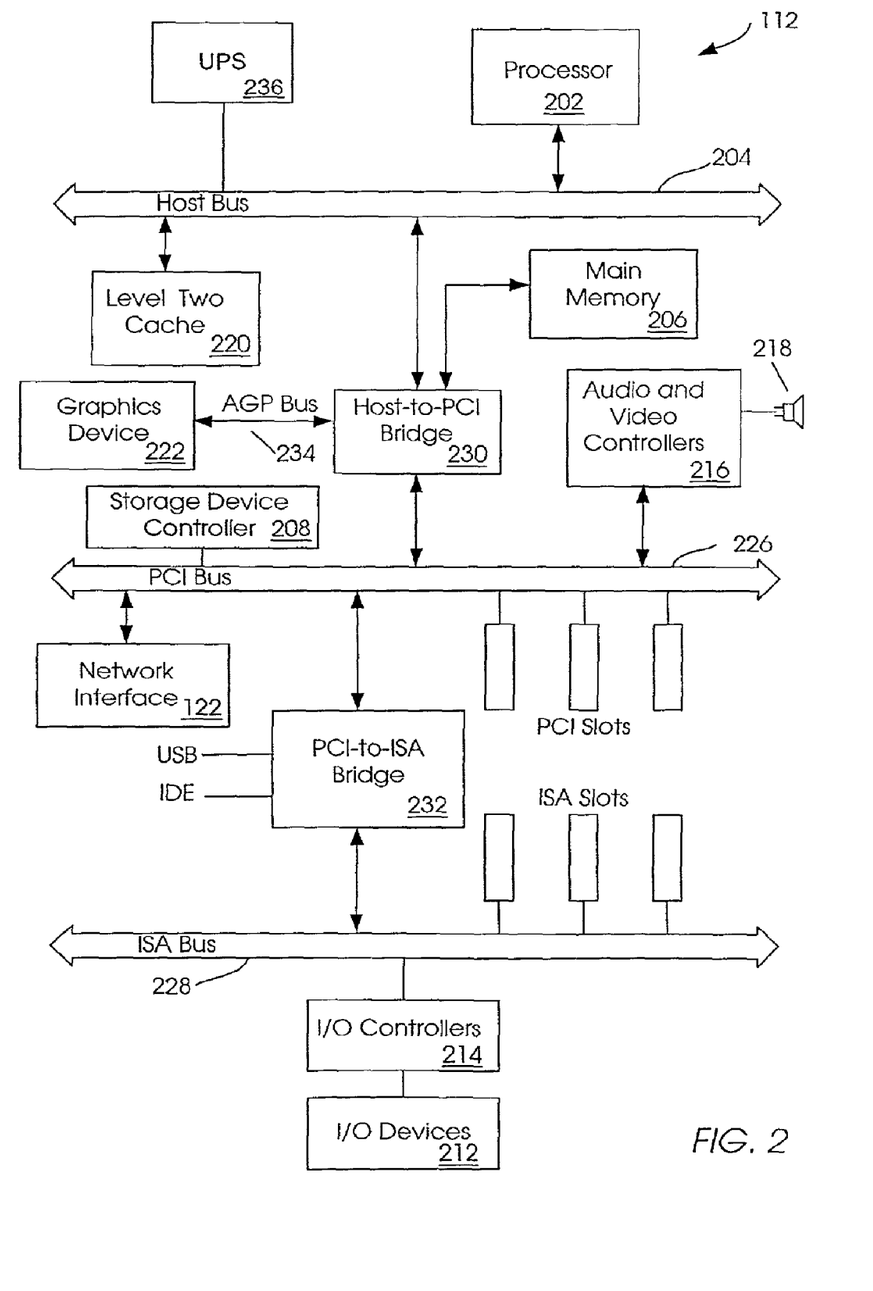
FIG. 2 is a diagram showing further details of an example of the workstation in FIG. 1.

FIG. 2 shows a block diagram of components comprising client workstation 112. One or more central processing units (CPU) 202 are connected by host bus 204 to main memory 206, storage device controller 208, network interface 210, and input/output (I/O) devices 212 connected via I/O controllers 214. Those skilled in the art will appreciate that workstation 112 can be embodied in a variety of computer systems including, for example, desktop, notebook, laptop, palmtop, and other devices that include information processing, storage, and networking components. In one embodiment, workstation 112 also includes cache memory 220 to facilitate quicker access between CPU 202 and main memory 206. In another embodiment, workstation 112 may include components such as audio and video controllers 216 and I/O peripheral devices such as speaker system 218, graphics device 222, and other I/O devices 212 such as display monitors, keyboards, mouse-type input devices, voice recognition devices, electronic pen devices, floppy and hard disk drives, DVD drives, and CD-ROM drives. In some embodiments, the peripheral devices communicate with CPU 202 over one or more buses 204, 226, 228, communicating with each other through one or more bridges, such as host-to-PCI bridge 230, and PCI-to-ISA bridge 232.

One skilled in the art will recognize that the foregoing components and devices are used as examples for sake of conceptual clarity and that various configuration modifications are common. Consequently, as used herein the specific exemplars set forth in FIG. 2 are intended to be representative of their more general classes. In general, use of any specific example herein is also intended to be representative of its class and the non-inclusion of such specific devices in the foregoing list should not be taken as indicating that limitation is desired.

Referring again to FIG. 1, application programs in the servers 114, 116, 118 are accessible by multiple users, yet, the processing and memory requirements at each workstation 112 are substantially less than that which would be required if the application programs were hosted on each workstation 112. However, when application programs are placed in the servers 114, 116, 118, they can be quite difficult to debug from workstation 112.

Figure 3:
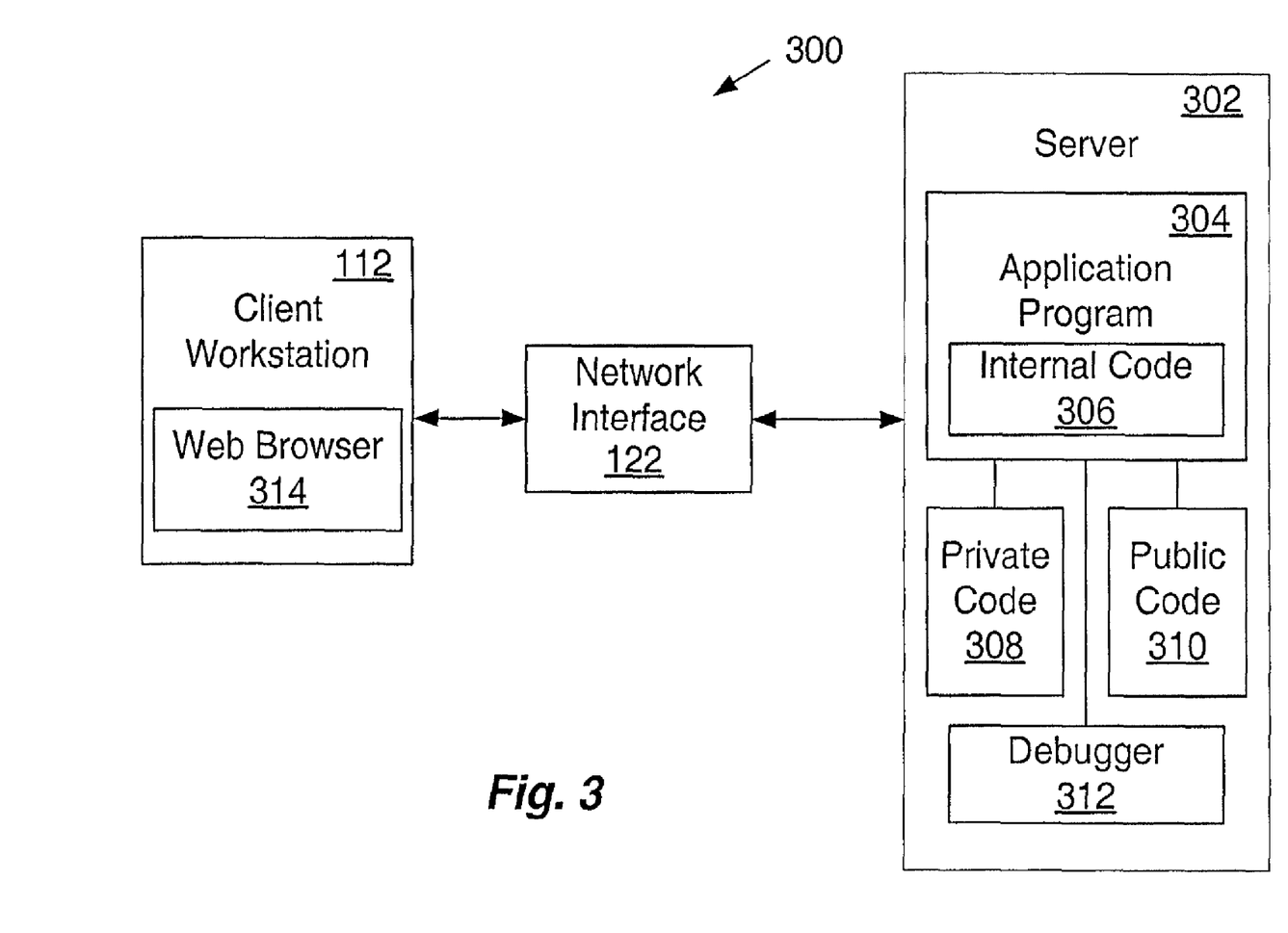
FIG. 3 is a diagram showing further detail of the network environment of FIG. 1 in accordance with the present invention.

FIG. 3 is a diagram of information network 300 in accordance with the present invention that is one example of an implementation of information network 100 (FIG. 1). Server 302 is representative of one or more of servers 114, 116, 118 that includes one or more application programs 304 with internal code 306 that is unique to application program 304. Server 302 can also include private code 308 that can only be accessed by authorized application programs 304 through the use of a password or other security mechanism. Public code 310 can also reside on server 302 for use by any application programs 304 that require it. Internal code 306, private code 308, and public code 310 can comprise data, logical instructions, and/or markup language files such as hypertext markup language (HTML) or extended markup language (XML) pages.

Server 302 also includes a debugger program 312 that can be used to troubleshoot problems from one or more remote client workstations 112. In the implementation shown in FIG. 3, web browser 314 provides a user interface to access application programs 304 and debugger program 312 via network interface 122. The debugger program 312 preferably has access to private code 308 and any other data associated with application programs 304. This includes java server pages (JSP) request/session parameters and public variables for objects.

An example of when debugger 312 can be used is when a user, running web browser 314 on the workstation 112, enters the universal resource locator (URL) to access one of the application programs 304 for a web page. After the user enters the URL into the workstation 112, the web browser 314 contacts the server 302 via the network interface 122, the corresponding application program 304 generates the requested web page, and the requested web page is transmitted via the network interface 122 to the web browser 314. Web browser 314 presents the requested web page to the user. The web page can include information from internal code 306, private code 308, and/or public code 310.

The web page display can include user interface controls such as selectable icons and buttons, scroll bars, data/command input areas, and field entry points. When the application program 304 for the requested web page includes an error, however, server 302 transmits an error message to the user's workstation 112 indicating that the application program 304 has failed. Web browser 314 can display the error message to the user.

Referring to FIGS. 3, and 4a-4d, FIGS. 4a-4d show examples of a graphical user interface (GUI) display 400 generated by debugger program 312 in accordance with the present invention. The GUI display 400 includes selectable features, such as tabs 404 and 406 to provide options to display a user frame 408 or a debugger frame 410.

Figure 4A:
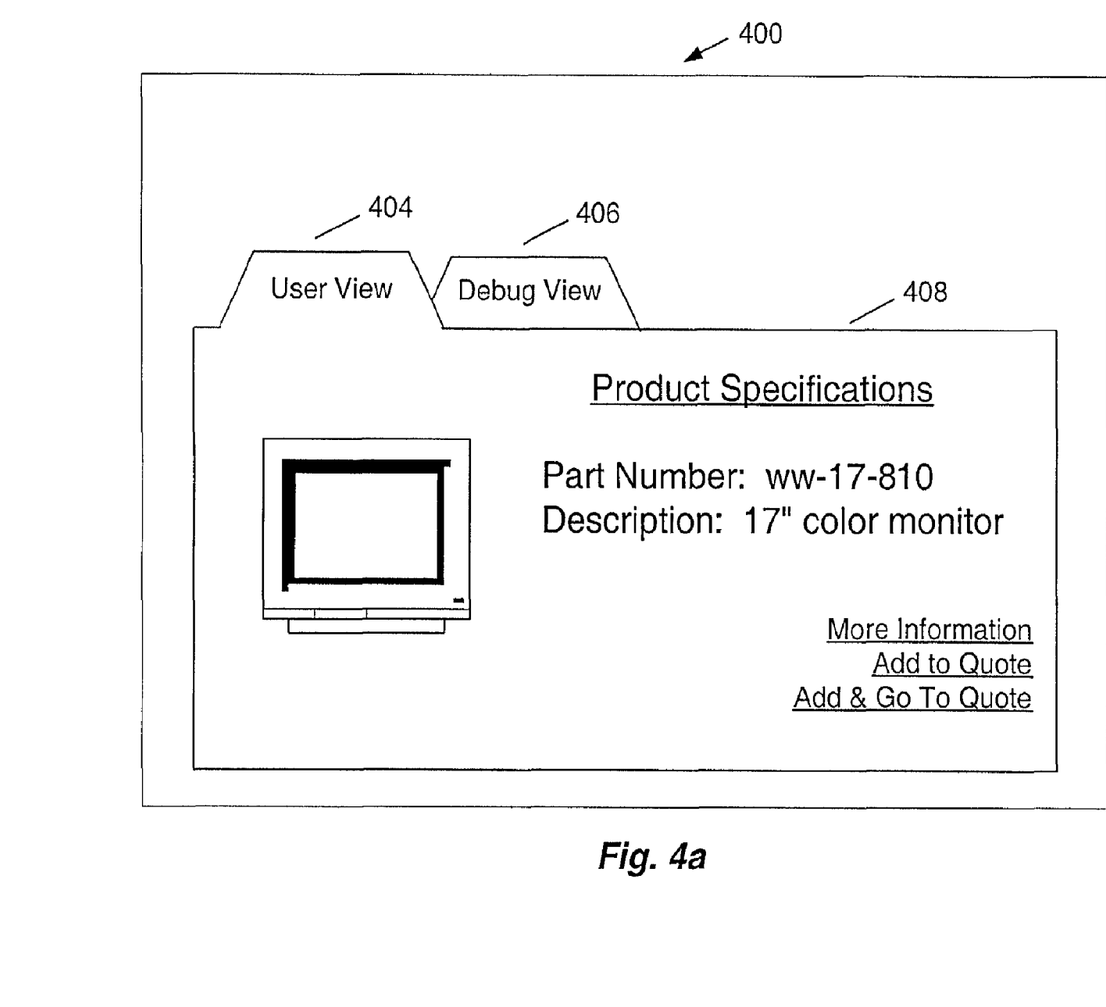
FIG. 4a is an example of a user frame generated by an application program.
Figure 4B:
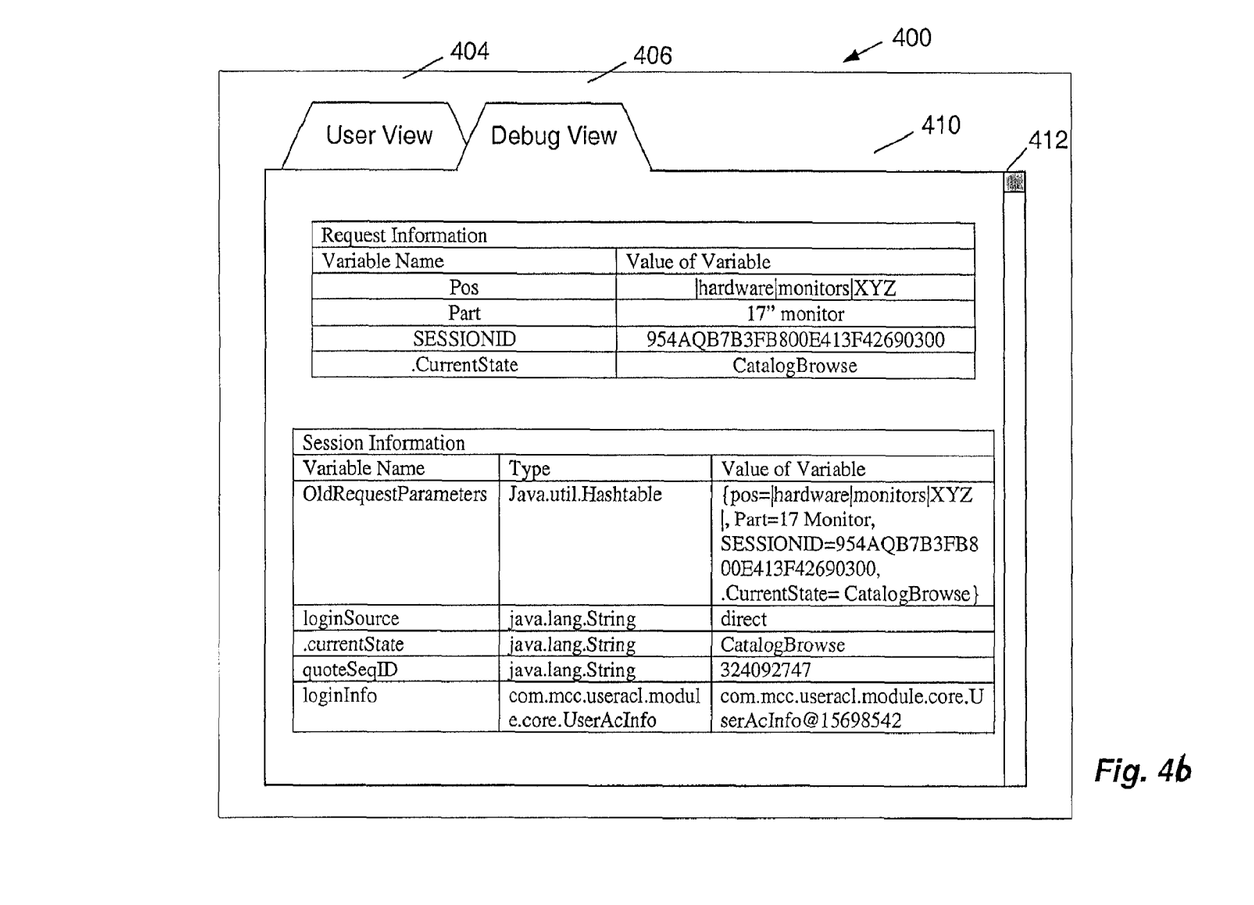
FIG. 4b is an example of a debug frame generated by a debugger program in accordance with the present invention.
Figure 4C:
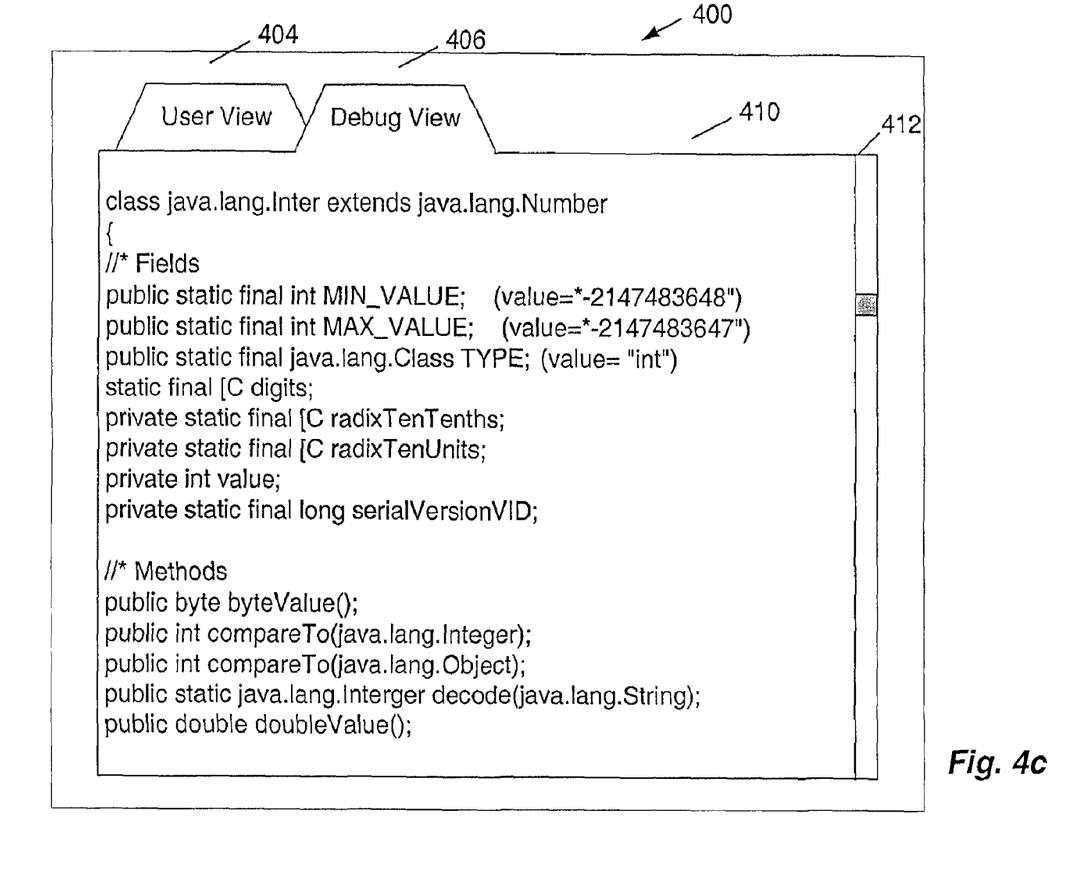
FIGS. 4c and 4d show further information that can be displayed for a variable selected by a user in the debug frame in FIG. 4b.
Figure 4D:
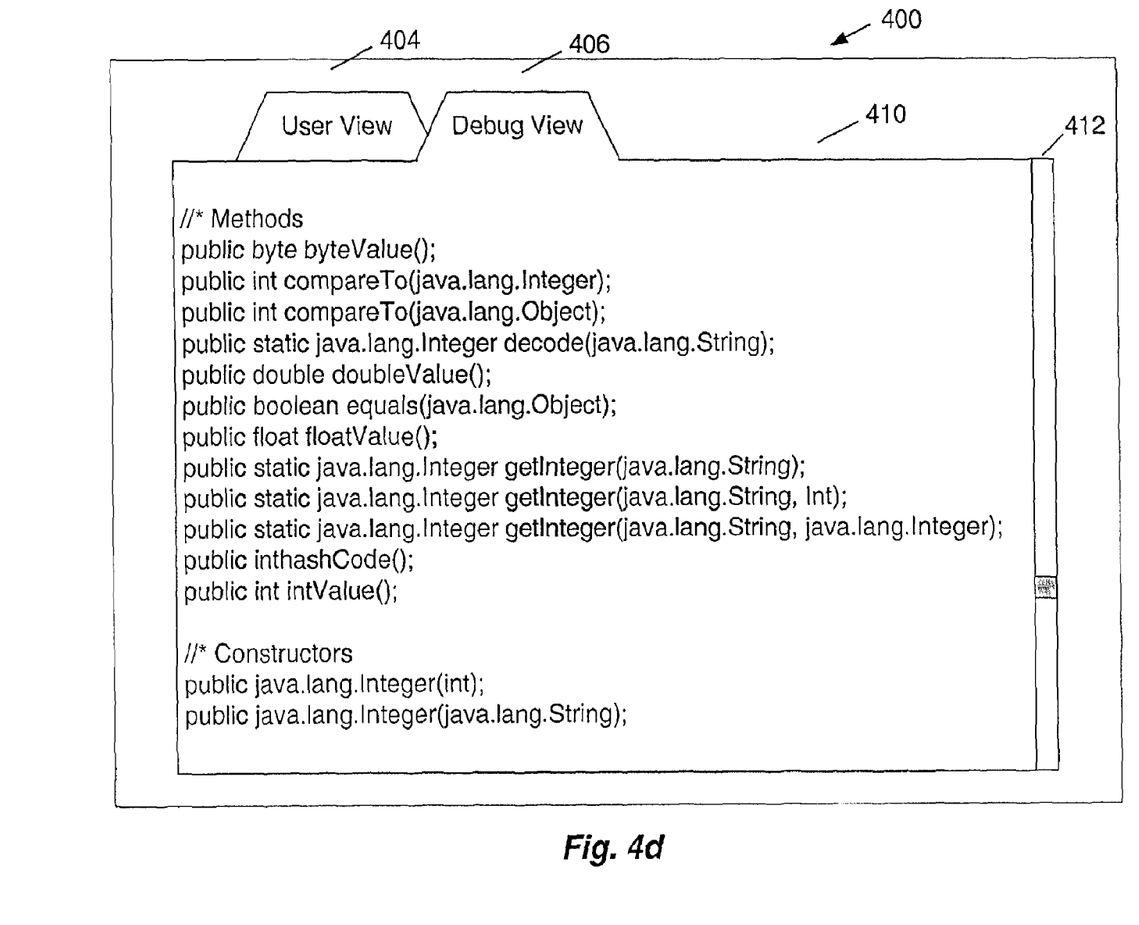

The user frame 408 includes information generated by the application program 304 being debugged. The debugger frame 410 is mapped to the user frame 408 from the standpoint that the context of the debugger frame 410 is sensitive to the context of the user frame 408. For example, FIG. 4a shows a catalog web page for a color monitor in user frame 408. FIGS. 4b-d show the debugger frame 410 with the various components in the application program 304, such as variables, variable values, fields, method calls, and constructors, used to generate the catalog web page in user frame 408. A scroll bar 412 allows the user to view more information than can be displayed on one screen.

For one of many reasons, user frame 408 may not render correctly. To investigate the reasons for the problem, the developer selects the debugger view tab 406, thereby causing the web browser 314 to link to the debugger program 312.

The debugger program 312 generates the debug information displayed in the debugger frame 410. A user can investigate the source of errors in the application program 304 that generates the information or error messages on the user frame 408. For example, user frame 408 can display the generic message "Null Pointer Exception" generated by the application program 304 when one or more variable(s) used by the web page has a null value. The debugger frame 410 allows the user to display the types and values of variables, methods and constructors associated with the variables, as shown in FIGS. 4b-4d. Other components of interest can also be displayed, depending on the type of application programming environment being used.

The ability to determine the cause of an error from the remote workstation 112 (FIG. 1) is more time and cost efficient than traveling to the site of server 302 to debug problems with the application programs 304.

Figure 5:
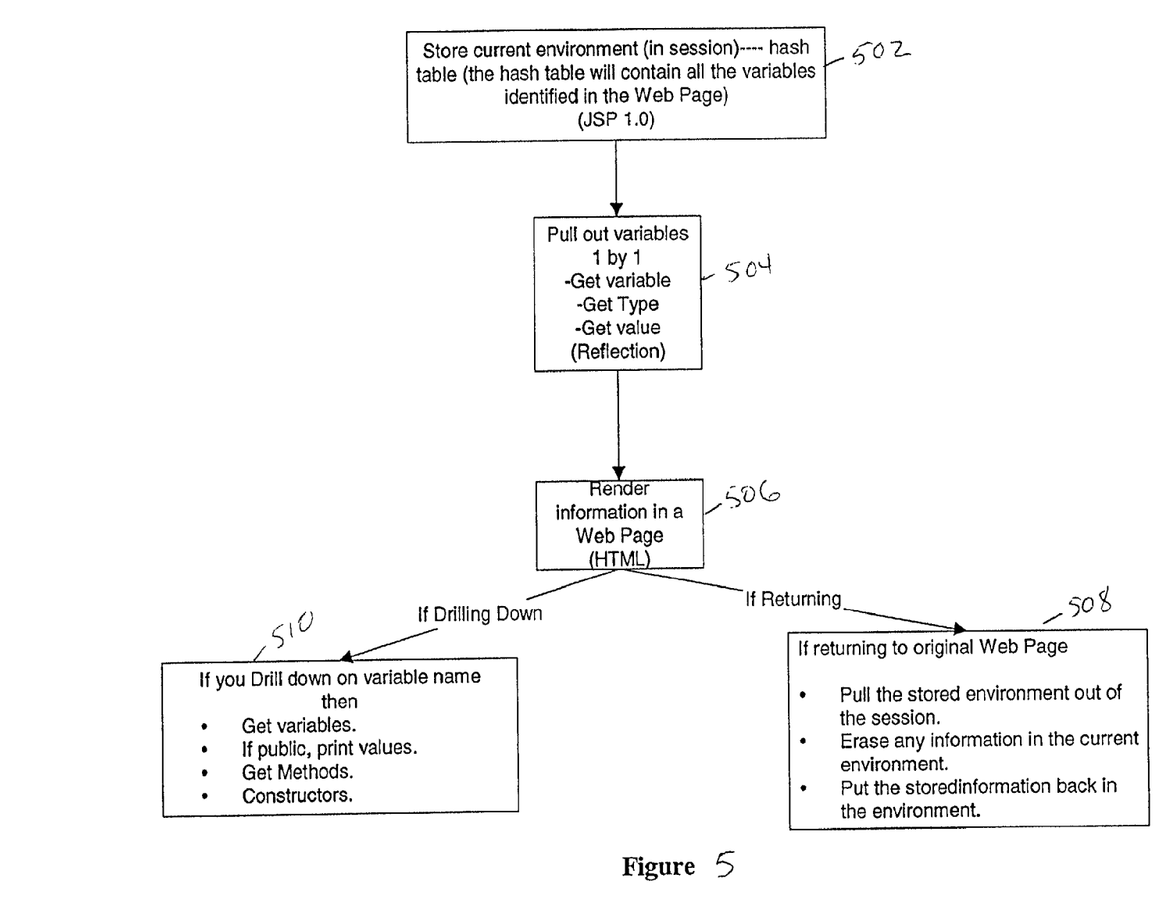
FIG. 5 is a flowchart of a method for storing and restoring variables of the user frame of FIG. 4a and generating information for the variables that can be displayed on the debug frames in FIGS. 4b-4d.

Referring to FIGS. 3 and 5, FIG. 5 shows an embodiment of a process for generating the debugger frame 410 (FIGS. 4b-4d) for an application program 304 (FIG. 3). In process 502, the current state of the application program 304 is stored, including a hash table of all the variables identified in the application program 304. In one implementation, technology known in the art as Java Server Pages, version 1.0 (JSP 1.0) is used to store the current state of the application program 304. This allows the user to return to the display on user frame 408. JSP 1.0 generates a Java source file for each JSP 1.0 file. The JSP processors produce three files for each JSP file including a java file, which contains the Java language code for the application program, also referred to as a servlet; a .class file, which is the compiled servlet; and a .xml file, which keeps track of the files generated by the processor.

Process 504 enables the user to examine components of the application program 304 to determine the source of the problems with the application program 304. In one embodiment, technology known in the art as "reflection" is used for this purpose in process 504. Reflection technology allows the user to examine variables including their type, class, and value. The variables are usually objects that contain further data including properties of the object and data that populates the object.

Thus, when executed, the debugger program 312 performs a context save of the current web page to enable a return to the user frame 408. In one implementation, the debugger program 312 reads the variables in the current web page using Reflection technology. The variables are either request parameters (passed back and forth to the user via hypertext transfer protocol (HTTP)), or session parameters. The session parameters are objects on server 302 that are not transmitted to the user. The session parameters store data that is used to generate the display, such as an HTML file for a web page.

The Java Reflection API can be used to introspect the private code 308, the public code 310, and the internal code 306 of an application program 304. The values for the objects can be stored in a database or in memory, as indicated by process 504, when a user invokes the debugger program 312 by selecting the debug view option 406 (FIG. 4*a*). The values for the objects can be restored when the user selects the user view option 404, as indicated by process 508.

Note that the Java programming language includes the AccessibleObject class method setAccessible( ) which can be used to enable access to all the declared fields that were retrieved with Reflection, including those that are private, protected. Ordinarily, Java's rules of access control prevent accessing private code 308. However, the AccessibleObject class (the superclass of Field, Method, and Constructor) provides setAccessible( ) methods that enable trusted code (or semitrusted code with the ReflectionPermission "suppressAccessChecks") to access private code 308 including fields and methods. A user can enable or disable display of data for private code 308.

Once process 504 completes the hash table for the variables, process 506 displays the information in the hash table in debugger frame 410, as shown, for example, in FIG. 4*b*. When the user queries one of the variables by selecting it from the display, process 510 generates the debug frame 510 shown in FIGS. 4*c* and 4*d* that includes the fields, values, methods, and constructors for the selected variable.

The user can select tab 404 to return to the user frame 408 at any time. The information that was displayed at the time the user selected tab 406 for the debugger frame 410 is restored in process 508. In one implementation, the stored state is retrieved, the current state is erased, and the retrieved state is restored.

Note that other suitable programming languages and methods for saving and restoring the state of an application program can be used instead of, or in addition to, Java and Reflection technology.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, various types of application programs residing on a remote server, in addition to, or instead of application programs for web pages, can be debugged from a remote workstation with the debugger program. It is therefore contemplated that such modifications can be made without departing from the spirit or scope of the present invention as defined in the appended claims.

What is claimed is:

1. A method of debugging an application program from a workstation, the method comprising:

executing a web browser at the workstation, wherein the application program and a debugger program reside on a server that is remote from the workstation;

invoking the application program and the debugger program using a user interface provided by the web browser and via a network interface to cause the server to execute the application program and the debugger program;

receiving a first web page from the server for displaying a user view in the web browser at the workstation;

displaying a user view at the workstation, wherein the user view that includes information generated by the application program;

displaying a debug view option at the workstation for generating for generating a second web page having a debug view of the application program; and receiving the second web page from the server for displaying the debug in the web browser at the workstation when the debug view option is selected; and displaying the debug view of the second web page at the workstation, wherein the debug view includes information related to the application program.

2. The method of claim 1 further comprising:

providing a user view option at the workstation for generating the user view; and displaying the user view when the user view option is selected.

3. The method of claim 1 wherein displaying the debug view of the second web page at the workstation includes providing a list of variable names in the application program.

4. The method of claim 3 wherein displaying the debug view of the second web page at the workstation includes providing at least one of: a list of request information variable names in the application program, or a list of session information variable names in the application program.

5. The method of claim 3, wherein one or more of the variable names represents a corresponding object, the method further comprising:

selecting one of the variable names; and providing information about the object corresponding to the variable name on the debug view.

6. The method of claim 5 wherein the information about the object includes at least one of: the fields of the object, the methods associated with the object, or the constructors associated with the object.

7. A computer readable storage media comprising: computer instructions to implement the method of claim 1.

8. A method of debugging an application program from a workstation, the method comprising:

executing the application program and a debugger program on the server when the application program is invoked from the workstation, wherein the application program and the debugger program reside on a server that is remote from the workstation;

generating information for a first web page, wherein the first web page comprises a user view that includes information generated by the application program;

transmitting the first web page to the workstation;

generating information for a second web page, wherein the second web page comprises a debug view when a debug view option is selected from the workstation, wherein the debug view includes information about components of the application program; and transmitting the second web page to the workstation.

9. The method of claim 8 wherein generating information for second web page includes saving the information for the user view when the debug view option is selected.

10. The method of claim 9 further comprising restoring the saved information for the user view when a user view option is selected at the workstation.

11. The method of claim 8 wherein generating information for the second web page includes generating a list of components of the application program.

12. The method of claim 8 wherein generating information for the second web page includes generating at least one of: a list of variables in the application program, a list of methods associated with one or more of the variables in the application program, or a list of constructors associated with one or more of the variables in the application program.

13. The method of claim 8 wherein generating information for the second web page includes using reflection technology to generate at least one of: a list of variables in the application program, a list of methods associated with one or more of the variables, and a list of constructors associated with one or more of the variables.

14. A computer readable storage media comprising:
computer instructions to implement the method of claim 8.

15. A workstation that is operable to support debugging an application program from the workstation, the workstation comprising:
a processor and a memory coupled to the processor, wherein the workstation is configured for:
executing a web browser at the workstation;
invoking the application program and a debugger program using a user interface provided by the web browser and to cause the server to execute the application program and the debugger program, wherein the application program and the debugger program reside on a server that is remote from the workstation;
receiving a first web page from the server for displaying a user view in the web browser at the workstation;
presenting the user view of the first web page in the web browser at the workstation, wherein the user view includes information generated by the application program;
presenting a debug view option in the web browser at the workstation to generate a second web page having a debug view of the application program;
receiving the second web page from the server for displaying the debug view in the web browser at the workstation when the debug view option is selected; and
presenting the debug view of the second web page in the web browser at the workstation when the debug view option is selected, wherein the debug view includes information related to the application program.

16. The workstation of claim 15 further comprising:
means for presenting a user view option at the workstation for generating the user view; and
means for presenting the user view when the user view option is selected.

17. The workstation of claim 15 wherein the debug view of the second web page in the web browser at the workstation includes a list of components of the application program.

18. The workstation of claim 15, wherein one or more of the components represents a corresponding object, the apparatus further comprising:
means for selecting one of the objects; and
means for presenting information about the selected object, wherein the information about the object includes at least one of: the name of the object, the fields of the object, the methods associated with the object, or the constructors associated with the object.

19. A tangible, computer readable storage medium comprising code stored thereon for supporting debugging of an application program from a workstation, wherein the code is executable by a processor for:
executing the application program and the debugger program on the server when the application program is invoked from the workstation, wherein the application program and a debugger program reside on a server that is remote from the workstation;
generating information for a first web page for display at the workstation, wherein the first web page comprises a user view that includes information generated by the application program; and
generating information for a second web page for display at the workstation, wherein the second web page comprises a debug view when a debug view option is selected from the workstation, wherein the debug view includes information about components of the application program.

20. The tangible, computer readable storage medium of claim 19 wherein the code is further executable by the processor for saving the information for the user view when the debug view option is selected.

21. The tangible, computer readable storage medium of claim 20 wherein the code is further executable by the processor for restoring the saved information for the user view when a user view option is selected at the workstation.

22. The tangible, computer readable storage medium workstation of claim 19 wherein the code is further executable by the processor for generating a list of objects in the application program.

23. The tangible, computer readable storage medium workstation of claim 22 wherein the code for generating a list of objects in the application program includes at least one of: code for generating a list of methods associated with one or more of the objects in the application program, or code for generating a list of constructors associated with one or more of the objects in the application program.

24. The tangible, computer readable storage medium of claim 23 wherein the code is further executable by the processor for providing in a web page at least one of: a list of names of the objects, a list of fields of at least one of the objects, a list of values of at least one of the objects, the list of methods associated with at least one of the objects, or the list of constructors associated with at least one of the objects.

25. The tangible, computer readable storage medium workstation of claim 22 wherein the code is further executable by the processor for using reflection technology to generate at least one of: a list of objects in the application program, a list of methods associated with one or more of the objects, and a list of constructors associated with one or more of the objects.

26. The tangible, computer readable storage medium of claim 22 wherein the code is further executable by the processor for providing the list of objects to the workstation in a web page when the debug view option is selected at the workstation.

27. A system for debugging an application program from a workstation, the system comprising:
a tangible, computer readable storage medium having a web browser stored therein, wherein the web browser is executable at the workstation and operable to:
interact with a web page displayed by the web browser to allow a user to invoke the application program and a debugger program from the workstation to cause the server to execute the application program and the debugger program, wherein the application program and the debugger program reside on a server that is remote from the workstation;

present a first web page, wherein the first web page comprises a user view that includes information generated by the application program;

present a debug view option to generate a second web page having a debug view of the application program; and present the debug view of the second web page when the debug view option is selected, wherein the debug view includes information related to the application program.

28. The system of claim 27 wherein the web browser executable at the workstation is further operable to:

present a user view option at the workstation; and present the user view when the user view option is selected.

29. The system of claim 27 wherein the debug view at the workstation includes a list of one or more components of the application program.

30. The system of claim 29 further wherein the web browser is operable to present a third web page, and the third web page comprises additional information about at least one of the components when the component is selected by the user.

31. The system of claim 30, wherein the additional information includes at least one of: the name of the component, the fields of the component, the methods associated with the component, or the constructors associated with the component.

32. The system of claim 27 wherein the application program generates instructions and information for displaying the web pages.

33. The system of claim 27 wherein web browser is operable to display graphical user controls to allow the workstation to communicate with the server.

34. A server that is operable to support debugging of an application program from a workstation, the system comprising:

a processor and a memory coupled to the processor, wherein the server is configured for:

executing the application program and a debugger program on the server when the application program is invoked from the workstation, wherein the application program and a debugger program reside on the server that is remote from the workstation;

generating information for a first web page for display at the workstation, wherein the first web page comprises a user view that includes information generated by the application program; and a debugger program operable to generate information for a second web page for display at the workstation, wherein the second web page comprises a debug view when a debug view option is selected from the workstation, wherein the debug view includes information about components of the application program.

35. The server of claim 34 wherein the debugger program is operable to save the information for the user view when the debug view option is selected.

36. The server of claim 35 wherein the debugger program is operable to restore the saved information for the user view when a user view option is selected at the workstation.

37. The server of claim 34 wherein the debugger program is operable to generate a list of objects in the application program.

38. The server of claim 37 wherein the debugger program is operable to generate in a web page at least one of: a list of methods associated with one or more of the objects in the application program, or a list of constructors associated with one or more of the objects in the application program.

39. The server of claim 34 wherein the debugger program is operable to use reflection technology to generate at least one of: a list of objects in the application program, a list of methods associated with one or more of the objects, and a list of constructors associated with one or more of the objects.

40. The server of claim 34 wherein the application program generates instructions and information for displaying the web pages.

41. The server of claim 34 wherein the server is operable to communicate with a web browser program at the workstation.

42. The server of claim 34 wherein the application program accesses at least one of: internal code, private code, or public code.

* * * * *